United States Patent
Tanimoto

(10) Patent No.: US 9,357,012 B2
(45) Date of Patent: May 31, 2016

(54) RELAY COMMUNICATION SYSTEM

(75) Inventor: Yoshifumi Tanimoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 346 days.

(21) Appl. No.: 13/985,933

(22) PCT Filed: Jan. 5, 2012

(86) PCT No.: PCT/JP2012/050054
§ 371 (c)(1),
(2), (4) Date: Sep. 20, 2013

(87) PCT Pub. No.: WO2012/111355
PCT Pub. Date: Aug. 23, 2012

(65) Prior Publication Data
US 2014/0052827 A1  Feb. 20, 2014

(30) Foreign Application Priority Data
Feb. 18, 2011  (JP) .................. 2011-034019

(51) Int. Cl.
*H04L 29/08* (2006.01)
*H04L 12/24* (2006.01)
*H04L 29/06* (2006.01)

(52) U.S. Cl.
CPC ............. *H04L 67/125* (2013.01); *H04L 41/04* (2013.01); *H04L 41/22* (2013.01); *H04L 41/28* (2013.01); *H04L 41/5061* (2013.01); *H04L 63/083* (2013.01); *H04L 67/025* (2013.01)

(58) Field of Classification Search
CPC ..... H04L 67/025; H04L 67/125; H04L 41/22; H04L 41/5061
See application file for complete search history.

(56) References Cited

U.S. PATENT DOCUMENTS 6,374,298 B2 *  4/2002  Tanno ................... H04L 67/025
                                                 709/227

(Continued)

FOREIGN PATENT DOCUMENTS

| JP | 09-168055 A | 6/1997 |
| JP | 2000-059465 A | 2/2000 |

(Continued)

OTHER PUBLICATIONS

Yasuhiro Shimizu, Machine translation of JP 2002-247036, Retrieved Sep. 22, 2015 from Japan Platform for Patent Information.*

(Continued)

*Primary Examiner* — Aaron Strange
(74) *Attorney, Agent, or Firm* — Keating & Bennett, LLP

(57) ABSTRACT

A center terminal includes a target terminal list storing unit that registers a target terminal and an operator list storing that registers an operator ID and a password. Each of the maintenance terminal and the target terminal includes a center terminal information storing unit that registers a center terminal. The center terminal makes a connection job that associates a predetermined target terminal with the operator ID and registers the connection job to the center terminal. One of maintenance terminals receives the specific operator ID and the password from a connected client terminal and sends the center terminal an indication whether or not the maintenance terminal can log in to the center terminal, and, if the logging-in is granted, the maintenance terminal is configured to receive the connection job assigned to the operator ID from the center terminal and notify the operator. If the maintenance terminal receives a selection of the connection job from the operator, the maintenance terminal sends an inquiry to the center terminal whether or not the maintenance terminal can execute the connection job. If the connection job is allowed to be executed, the maintenance terminal can be connected to the target terminal included in the connection job.

6 Claims, 16 Drawing Sheets

(56) References Cited

U.S. PATENT DOCUMENTS

| | | | |
|---|---|---|---|
| 2002/0087888 A1* | 7/2002 | Yamakawa | H04L 12/2803 726/11 |
| 2002/0131405 A1* | 9/2002 | Lin | G06F 8/65 370/352 |
| 2003/0144872 A1 | 7/2003 | Masui et al. | |
| 2007/0027951 A1* | 2/2007 | Motoyama | G06Q 30/02 709/203 |
| 2008/0137672 A1* | 6/2008 | Tanimoto | H04L 12/66 370/401 |
| 2009/0172075 A1* | 7/2009 | Tanimoto | H04L 67/104 709/201 |

FOREIGN PATENT DOCUMENTS

| | | |
|---|---|---|
| JP | 2002-247036 A | 8/2002 |
| JP | 2010-009129 A | 1/2010 |
| JP | 2010-219598 A | 9/2010 |

OTHER PUBLICATIONS

Koji Suzuki, Machine translation of JP 2000-059465, Retrieved Sep. 22, 2015 from Japan Platform for Patent Information.*

Official Communication issued in International Patent Application No. PCT/JP2012/050054, mailed on Mar. 27, 2012.

Tanimoto, "Relay-Server Arranged to Carry Out Communications Between Communication Terminals on Different LANs," U.S. Appl. No. 11/853,943, filed Sep. 12, 2007.

Tanimoto, "File Server Device Arranged in a Local Area Network and Being Communicable With an External Service Arranged in a Wide Area Network," U.S. Appl. No. 11/862,654, filed Sep. 27, 2007.

Tanimoto, "File Transfer Server," U.S. Appl. No. 11/870,622, filed Oct. 11, 2007.

Tanimoto, "Relay Server and Client Terminal," U.S. Appl. No. 11/953,351, filed Dec. 10, 2007.

Tanimoto, "Relay Server, Relay Communication System, and Communication Device," U.S. Appl. No. 11/944,495, filed Nov. 23, 2007.

Tanimoto, "Relay Server and Relay Communication System Arranged to Share Resources Between Networks," U.S. Appl. No. 11/953,505, filed Dec. 10, 2007.

Tanimoto, "Relay Server and Relay Communication System," U.S. Appl. No. 12/103,933, filed Apr. 16, 2008.

Tanimoto, "Relay Server and Relay Communication System," U.S. Appl. No. 12/112,127, filed Apr. 30, 2008.

Tanimoto, "Relay Server and Relay Communication System," U.S. Appl. No. 12/107,793, filed Apr. 23, 2008.

Tanimoto, "Relay Server and Relay Communication System," U.S. Appl. No. 12/270,883, filed Nov. 14, 2008.

Tanimoto, "Relay Server and Relay Communication System," U.S. Appl. No. 12/335,642, filed Dec. 16, 2008.

Tanimoto, "Relay Server and Relay Communication System," U.S. Appl. No. 12/335,661, filed Dec. 16, 2008.

Tanimoto, "Relay Server and Relay Communication System Including a Relay Group Information Registration Unit, a Shared Resource Information Registration Unit, and a Control Unit," U.S. Appl. No. 12/340,868, filed Dec. 22, 2008.

Tanimoto, "Relay Device and Relay Communication System," U.S. Appl. No. 11/723,466, filed Mar. 20, 2007.

Tanimoto, "Relay Server, Communication System and Facsimile System," U.S. Appl. No. 10/045,698, filed Jan. 10, 2002.

Tanimoto, "Relay Server, Communication System and Facsimile System," U.S. Appl. No. 10/045,897, filed Jan. 10, 2002.

Tanimoto, "Relay Server for Relaying Communications Between Network Devices," U.S. Appl. No. 10/114,720, filed Apr. 1, 2002.

Tanimoto, "Relay Server," U.S. Appl. No. 10/114,963, filed Apr. 2, 2002.

Tanimoto, "Relay Server, Network Device, Communication System, and Communication Method," U.S. Appl. No. 10/116,615, filed Apr. 2, 2002.

Tanimoto, "First Relay Server and Second Relay Server," U.S. Appl. No. 13/255,958, filed Oct. 3, 2011.

Tanimoto, "Relay Server and Relay Communication System," U.S. Appl. No. 13/061,234, filed Feb. 28, 2011.

Tanimoto, "Relay Device and Communication System," U.S. Appl. 13/341,711, filed Dec. 30, 2011.

Tanimoto, "Relay Communication System and First Relay Server," U.S. Appl. No. 13/320,034, filed Nov. 11, 2011.

Tanimoto, "Relay Communication System and Access Management Apparatus," U.S. Appl. No. 13/390,561, filed Feb. 15, 2012.

Tanimoto, "Relay Server and Relay Communication System," U.S. Appl. No. 13/496,664, filed Mar. 16, 2012.

Tanimoto, "Relay Server, Relay Communication System, and Communication Apparatus," U.S. Appl. No. 13/061,725, filed Mar. 2, 2011.

Tanimoto, "Relay Server, Relay Communication System, and Communication Apparatus," U.S. Appl. No. 13/610,172, filed Sep. 11, 2012.

Tanimoto, "Relay Server and Relay Communication System Arranged to Share Resources Between Networks," U.S. Appl. No. 13/153,497, filed Jun. 6, 2011.

Tanimoto, "Relay Server and Relay Communication System," U.S. Appl. No. 13/497,535, filed Mar. 22, 2012.

Tanimoto, "Relay Server and Relay Communication System," U.S. Appl. No. 13/667,020, filed Nov. 2, 2012.

Tanimoto, "File Server Device," U.S. Appl. No. 13/650,180, filed Oct. 12, 2012.

Tanimoto, "Relay Server and Relay Communication System," U.S. Appl. No. 13/676,162, filed Nov. 14, 2012.

Tanimoto, "Relay Server and Relay Communication System," U.S. Appl. No. 13/885,821, filed May 16, 2013.

Tanimoto, "Relay Communication System and Relay Servers," U.S. Appl. No. 13/994,185, filed Jun. 14, 2013.

Tanimoto, "Relay Communication System and Relay Servers," U.S. Appl. No. 13/994,187, filed Jun. 14, 2013.

Tanimoto, "Relay Communication System and Relay Servers," U.S. Appl. No. 13/994,188, filed Jun. 14, 2013.

English translation of Official Communication issued in corresponding International Application PCT/JP2012/050054, mailed on Aug. 22, 2013.

* cited by examiner

53a

| Operator list | | |
|---|---|---|
| ID | PWD | Log-in terminal |
| Op1 | Abc | Op1/Maintenance2@relaysystem.net |
| Op2 | Xyz | Op2/Center@relaysystem.net |
| Op3 | Gnh | Op3/Maintenance1@relaysystem.net |
| Op4 | Ikeu | |

| Maintenance terminal list | |
|---|---|
| Name | Terminal ID |
| CS hub 1 | Maintenance1@relaysystem.net |
| CS hub 2 | Maintenance2@relaysystem.net |
| Headquarter | Maintenance3@relaysystem.net |
| Satellite office | Maintenance4@relaysystem.net |

| Target terminal list | |
|---|---|
| Name | Terminal ID |
| ABC Corporation | Target1@relaysystem.net |
| OX Corporation | Target2@relaysystem.net |
| 123 Corporation | Target3@relaysystem.net |
| 456 Corporation | Target4@relaysystem.net |

| Connection job list | | |
|---|---|---|
| Target terminal ID | Connection candidate ID | Job information |
| Target1@relaysystem.net | Op1 | Op 1 in execution |
| Target2@relaysystem.net | Op1,Op3 | |

Making a maintenance job                                         ⊠

Customer: | Customer 4 | ∨ |

Addible maintenance operator:                Selected maintenance operator

| Name ▽ | Information |
|---|---|
| Shiraishi | Hokkaido |
| Fuyuzuki | Osaka |

| Name ▽ | Information |
|---|---|
| Hoshino | Kyoto |
| Natsume | Tokyo |
| Shiozawa | Osaka |

→(R)

←(L)

Job information 1: | Connection test | ∨ |

Job information 2:
Caution 1
Caution 2
Caution 3
Caution 4|

OK    Cancel

FIG. 18

RELAY COMMUNICATION SYSTEM

BACKGROUND OF THE INVENTION

1. Field of the Invention

The present invention relates to a relay communication system where client terminals that are connected with relay servers are connected with each other, as necessary, via the relay servers connected with each other via a network.

2. Description of the Related Art

A remote maintenance system where monitoring and maintenance of electronic equipment that is provided in an office or at home has been in practical use, for example (See, for example, Japanese Laid-Open Patent Application No. 2003-223521). By using the remote maintenance system, a service technician of a maintenance company can perform the maintenance of the electronic equipment without the service technician being on site. In addition, by remotely controlling the electronic equipment, when a problem is caused in the electronic equipment, the service technician of the maintenance company can solve the problem quickly.

As one example of the remote maintenance system, a relay communication system where client terminals that are connected with relay servers are connected with each other as required via the relay servers connected with each other via a network has been known. Specifically, a server at a call center, a server at a maintenance center, and a server of a customer are connected with each other so as to communicate with each other. Terminals are connected to each of the server at the call center and the server at the maintenance center and a target system is connected to the server of the customer.

In a conventional remote maintenance system, the server at the call center sends a maintenance request to the server at the maintenance center. At this point, an operator at the call center notifies an operator at the maintenance center of a one-time password by phone and then an operator at the maintenance center connects the server at the maintenance center to the server of the customer using the one-time password. Then, the operator performs a remote maintenance of the target system connected to the server of the customer by operating the server at the maintenance center.

However, in the conventional remote maintenance system, it is annoying that the operator at the call center notifies the operator at the maintenance center of the one-time password by phone. In addition, since only the maintenance operator who knows the one-time password can log in, it is difficult to deal with the problem quickly.

SUMMARY OF THE INVENTION

In view of the above, preferred embodiments of the present invention enable a relay communication system including relay servers connected with each other to quickly connect in response to a connection request.

A plurality of aspects of various preferred embodiments of the present invention will be explained below. These aspects can be combined arbitrarily as required or desired.

A relay communication system according to one aspect of a preferred embodiment of the present invention includes client terminals and relay servers connected via a network. Each client terminal is configured to communicate, via the relay server to which the client terminal is connected, with another relay server or the client terminal that is connected to the relay server. Each relay server is also configured to communicate with another relay server or with the client terminal that is connected to the relay server. The relay servers are configured to communicate with each other via a WAN. The client terminal is configured to communicate with the relay server where the client terminal is connected, via a LAN. The relay communication system includes a specific relay server configured to function as a center terminal, at least one relay server configured to function as one or more target terminals, and at least one relay server configured to function as one or more maintenance terminals. In addition, the relay communication system includes a client terminal configured to function as a target system connected to any of the target terminals via a first LAN and a client terminal configured to function as a maintenance operating terminal connected to any of the maintenance terminal via a second LAN. The target system is operated by the maintenance operating terminal via the first LAN, the WAN, and the second LAN. The center terminal includes a target terminal registering unit configured to register the target terminal and an operator registering unit configured to register an operator ID and an PWD. Each of the maintenance terminal and the target terminal includes a center terminal ID registering unit configured to register a center terminal ID. The center terminal is configured to perform a connection job that associates a predetermined target terminal with the operator ID and register the connection job to the center terminal. Any one of the maintenance terminals is configured to receive the specific operator ID and the PWD from a connected maintenance operating terminal and send an inquiry to the center terminal whether or not the maintenance terminal can log in to the center terminal, and, if the logging-in is granted, the maintenance terminal is configured to receive the connection job assigned to the operator ID from the center terminal and notify the operator of the connection job. When the maintenance terminal receives a selection of the connection job from the operator, the maintenance terminal is configured to send an inquiry to the center terminal whether or not the maintenance terminal can execute the connection job. If the connection job is allowed to be executed, the maintenance terminal is connected to the target terminal included in the connection job.

Therefore, the maintenance terminal can connect to the target terminal quickly in response to the connection request in the relay communication system where the relay servers are connected with each other.

It is acceptable that, when the center terminal receives an inquiry whether or not the maintenance terminal can execute the connection job, the center terminal is configured to notify the maintenance terminal of a permission to execute the connection job if the connection job is not being executed by another operator registered in the connection job. It is acceptable that, the center terminal is configured to notify the maintenance terminal that the connection job selected is being executed and notify the maintenance terminal of operator information in execution if the connection job is being executed by another operator registered in the connection job.

It is acceptable that, if the center terminal receives from the maintenance terminal an inquiry whether or not the maintenance terminal can execute the connection job and notifies the maintenance terminal of the permission to execute the connection job, the center terminal is configured to register the connection job being executed to the connection job and notify another operator, who is included in the connection job and logs in via any one of the maintenance terminals, that the connection job is updated.

It is acceptable that, if the center terminal receives from the maintenance terminal a notification of finishing the connection job and determines based on the notification that the connection job is finished, the center terminal is configured to delete the connection job. It is acceptable that, if the center terminal determines a condition other than that the connection job is finished, the center terminal is configured to delete the status information showing that the connection job is in execution from the connection job. It is acceptable that the center terminal is configured to notify an operator, who is included in the connection job and logs in via any one of the maintenance terminals, that the connection job is updated.

It is acceptable that the center terminal includes a maintenance terminal registering unit configured to register a relay server that becomes the maintenance terminal. It is acceptable that, if the center terminal receives via the maintenance terminal a log-in request with the specific operator ID and PWD, the center terminal is configured to determine whether or not the maintenance terminal which the operator uses is a registered terminal. It is acceptable that, if the maintenance terminal which the operator uses is registered, the center terminal is configured to check the operator ID and PWD, and otherwise, the center terminal is configured to return an error.

A relay communication system according to another aspect of a preferred embodiment of the present invention is a relay communication system including a plurality of relay servers connected with each other so as to communicate with each other via a WAN. The relay communication system includes an administering relay server, a plurality of first relay servers, and at least one second relay server. A target system is connected to the first relay server via a first LAN and a maintenance operating terminal is connected to the second relay sever via a second LAN. The administering relay server is configured to memorize or store first relay server IDs of the plurality of the first relay servers and at least one operator ID. The administering relay server is configured to receive registration of a connection job that associates the first relay server ID with the operator ID and memorize or store the connection job. The second relay server is configured to receive the operator ID from the maintenance operating terminal and notify the administering relay server of the operator ID. The administering relay server is configured to receive the operator ID from the second relay server and authenticate the operator ID. The administering relay server is configured to select the connection job that includes the operator ID from the connection jobs and send the connection job that is selected to the second relay server. The second relay server is configured to receive the connection job from the administering relay server and notify the maintenance operating terminal of the connection job. The second relay server is configured to request the administering relay server to execute the connection job that is selected by the maintenance operating terminal. The administering relay server is configured to send possible-to-connect information in response to a request to execute the connection job from the second relay server. The second relay server is configured to receive the possible-to-connect information from the administering relay server and connect the maintenance operating terminal to, via the first relay server, the target system based on the connection job if the connection is possible.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a figure showing an operator list.
FIG. 4 is a figure showing a maintenance terminal list.
FIG. 5 is a figure showing a target terminal list.
FIG. 6 is a figure showing a connection job list.
FIG. 18 is a connection job making screen of a center terminal management application displayed on a screen of a center terminal operating terminal.

DETAILED DESCRIPTION OF THE PREFERRED EMBODIMENTS

In the following, a remote maintenance system will be explained according to various preferred embodiments of the present invention. It should be noted that the following is a non-limiting description of examples of preferred embodiments of the present invention.

Figure 1:
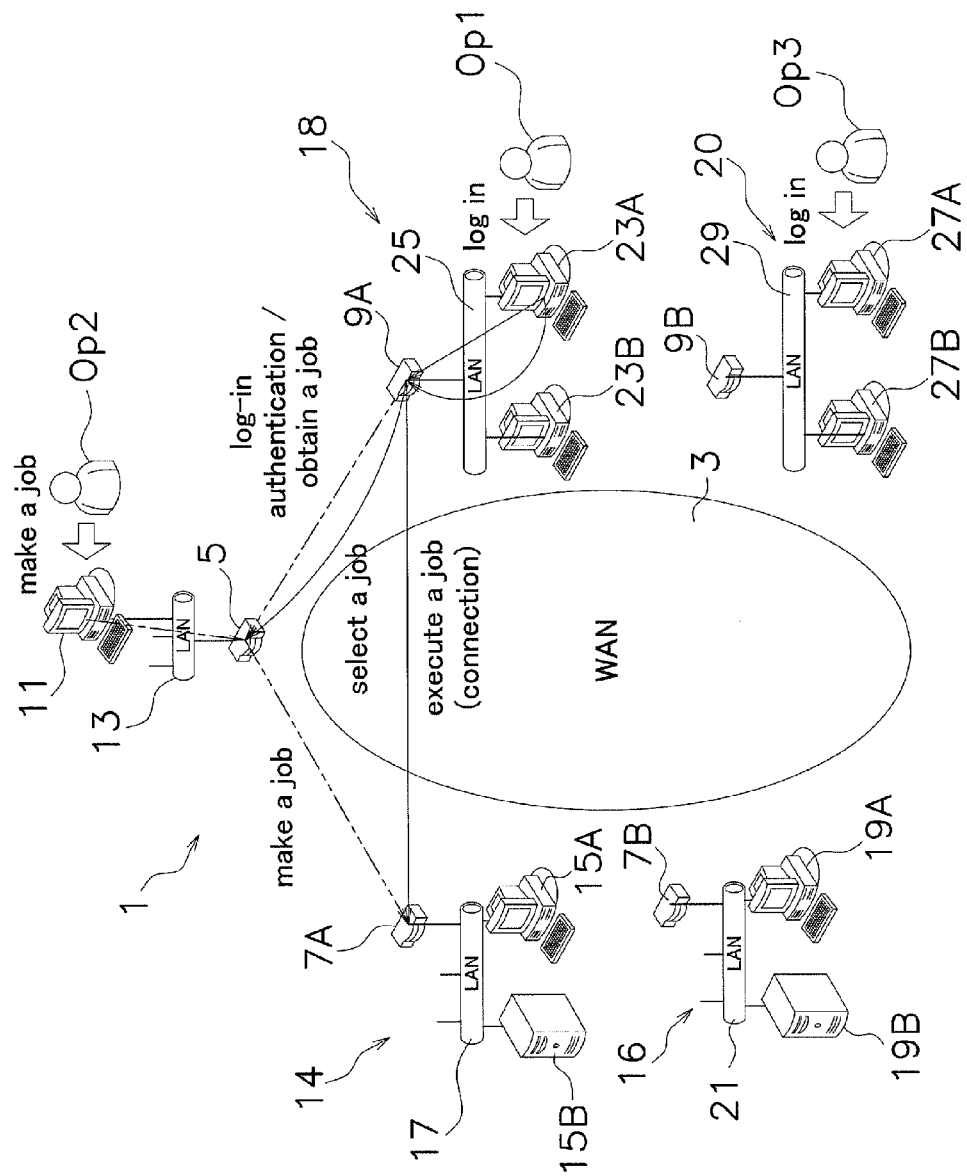
FIG. 1 is a figure showing a basic structure of a relay communication system.

A brief overview of a relay communication system 1 according to the present preferred embodiment of the present invention will be explained. FIG. 1 is a figure showing a basic structure of the relay communication system. The relay communication system 1 includes client terminals and relay servers connected via a network. Each client terminal is configured to communicate with, via a relay server to which the client terminal is connected, the other relay servers or the client terminal that is connected to the relay server. Each relay server is configured to communicate with other relay servers or with the client terminal connected to the relay server.

The relay communication system 1 includes a plurality of relay servers configured to connect with each other so as to communicate with each other via a WAN (Wide Area Network) 3. The WAN 3 preferably is a wide-area network such as the Internet, for example.

The plurality of the relay servers includes a center terminal 5, a first target terminal 7A, a second target terminal 7B, a first maintenance terminal 9A, and a second maintenance terminal 9B. It should be noted that the number of the target terminals and the maintenance terminals may be more than 3, for example. In addition, it is acceptable that the number of the target terminal is one, for example.

The center terminal 5 is arranged, for example, at a call center where inquiries from users, etc., are received. The center terminal 5 manages access rights of the first maintenance terminal 9A and the second maintenance terminal 9B to the first target terminal 7A and the second target terminal 7B. A center terminal operating terminal 11 is connected to the center terminal 5 via a LAN 13 (Local Area Network) so as to communicate with each other. An ID of the center terminal 5 is Center@relaysystem.net.

The first target terminal 7A functions, for example, as a relay server of a customer. A first target system 15A and a second target system 15B are connected to the first target terminal 7A via a first LAN 17 so as to communicate with each other. The first LAN group 14 is constructed of the above-described elements. The first target system 15A and the second target system 15B are file servers or Web servers that are targets. It should be noted that the number of the target systems may be 1 or the number may be more than 3, for example. An ID of the first target terminal 7A is Target1@relaysystem.net.

The second target terminal 7B is a relay server of a customer. A third target system 19A and a fourth target system 19B are connected to the second target terminal 7B via a second LAN 21. A second LAN group 16 is constructed of the above-described elements. The third target system 19A and the fourth target system 19B are file servers or Web servers that are maintained. It should be noted that the number of the target systems may be 1 or the number may be more than 3, for example. An ID of the second target terminal 7B is Target2@relaysystem.net.

The first maintenance terminal 9A is a relay server arranged at the maintenance center. A first maintenance operating terminal 23A and a second maintenance operating terminal 23B are connected to the first maintenance terminal 9A via a third LAN 25. A third LAN group 18 is constructed of the above-described elements. It should be noted that the number of the maintenance operating terminals connected to the first maintenance terminal 9A may be 1 or the number may be more than 3, for example. An ID of the first maintenance terminal 9A is Maintainance2@relaysystem.net.

The second maintenance terminal 9B is a relay server arranged at the maintenance center. A third maintenance operating terminal 27A and a fourth maintenance operating terminal 27B are connected to the second maintenance terminal 9B via a fourth LAN 29. A fourth LAN group 20 is constructed of the above elements. It should be noted that the number of the maintenance operating terminals connected to the second maintenance terminal 9B may be 1 or the number may be more than 3, for example. An ID of the second maintenance terminal 9B is Maintainance1@relaysystem.net.

In the above structure, the center terminal operating terminal 11, the third target system 19A, the fourth target system 19B, the first maintenance operating terminal 23A, the second maintenance operating terminal 23B, the third maintenance operating terminal 27A, and the fourth maintenance operating terminal 27B are terminals such as personal computers, for example. The center terminal 5, the first target terminal 7A, the second target terminal 7B, the first maintenance terminal 9A, and the second maintenance terminal 9B are relay servers that relay communications of the clients. It should be noted that the first maintenance terminal 9A and the second maintenance terminal 9B may be memories or storage devices that can be attached to and removed from personal computers and applications saved therein, for example.

If a maintenance operator remotely maintains the first target system 15A, the second target system 15B, the third target system 19A, and the fourth target system 19B, using the first maintenance terminal 9A or the second maintenance terminal 9B, a routing session is established between the first maintenance terminal 9A or the second maintenance terminal 9B and the first target terminal 7A or the second target terminal 7B.

The routing session is a media session that routing-controls communication packets transmitted between the first LAN group 14 or the second LAN group 16 and the third LAN group 18 or the fourth LAN group 20.

In order to establish the routing session, the first maintenance terminal 9A or the second maintenance terminal 9B obtains an access permit to the first target terminal 7A or to the second target terminal 7B from the center terminal 5. After obtaining the access permit, the first maintenance terminal 9A or the second maintenance terminal 9B establishes the routing session between the first target terminal 7A or the second target terminal 7B.

In the above-described system, the maintenance operator is not tied to a specific maintenance terminal. In other words, the maintenance operator can participate in the relay communication system 1 using any of the various maintenance terminals. More specifically, since an ID and password of each maintenance operator is saved in the center terminal 5 and the center terminal 5 authenticates a logging-in, the maintenance operator can log in to the relay communication system 1 by inputting the ID and password of the maintenance operator to the maintenance operating terminal.

Figure 2:
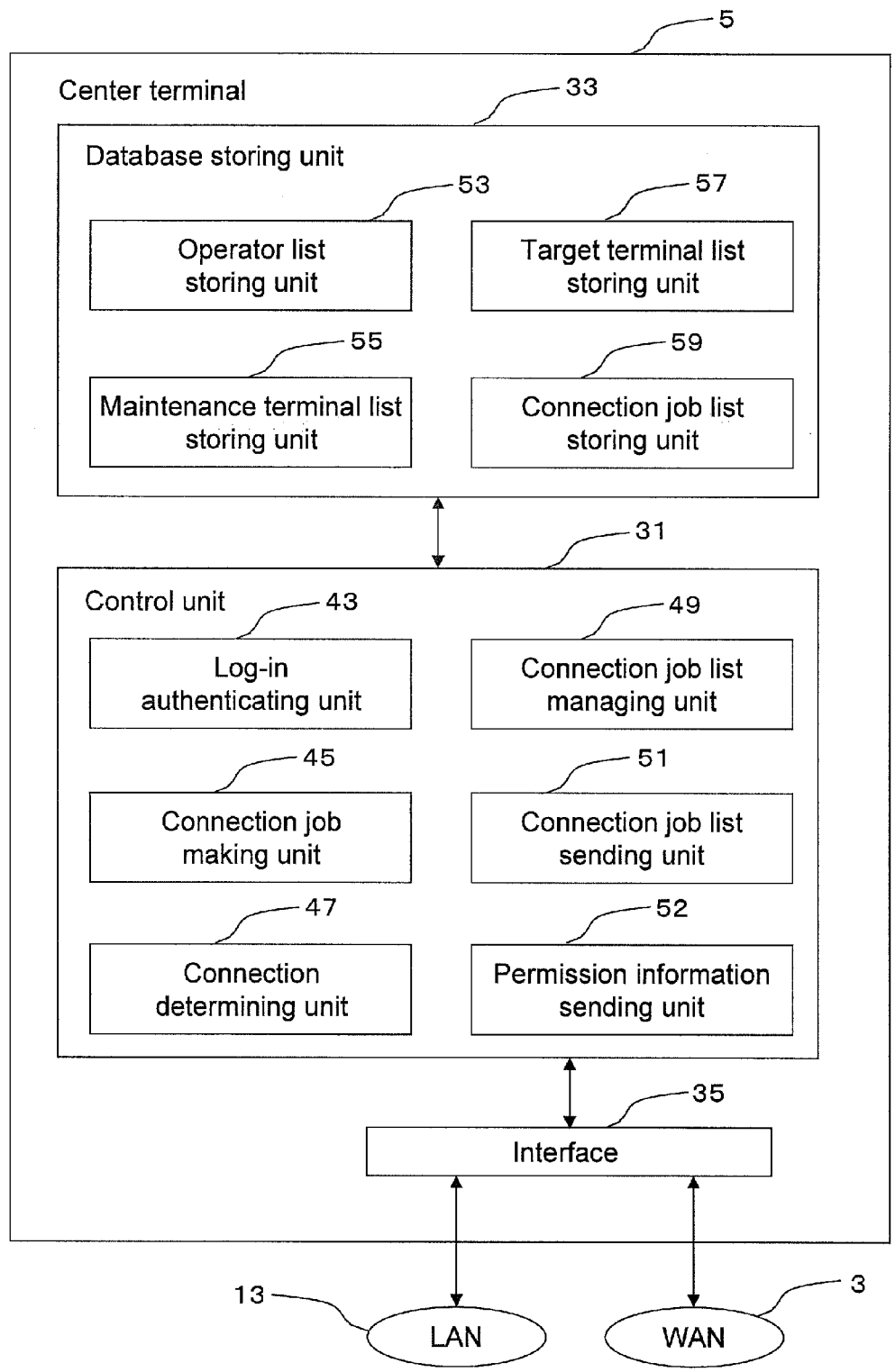
FIG. 2 is a figure showing a structure of a center terminal.

Referring to FIG. 2, a structure of the center terminal 5 will be explained. FIG. 2 is a figure showing the structure of the center terminal.

The center terminal mainly includes a control unit 31, a database storing unit 33, and an interface 35.

The control unit 31 is programmed to control the whole center terminal 5. The control unit 31 preferably is a computer having CPU, RAM, and ROM and realizes various functions by executing a program stored in the memory. The control unit 31 includes a log-in authenticating unit 43, a connection job making unit 45, a connection determining unit 47, a connection job list managing unit 49, a connection job list sending unit 51, and a permission information sending unit 52.

The log-in authenticating unit 43 authenticates a log-in information. The connection job making unit 45 performs a connection job that is information relating to a connection to the first target terminal 7A or the second target terminal 7B. The connection determining unit 47 determines whether or not the connection between the maintenance terminal that sends a job selection and the target terminal can be established. The connection job list managing unit 49 manages the made job list in a form of a connection job list 59a, adds the connection job to the connection job list 59a, updates the connection job in the connection job list 59a, or deletes the connection job from the connection job list 59a, as described later. The connection job list sending unit 51 sends a portion of or all of the connection job list 59a stored in the connection job list storing unit 59 to the first maintenance terminal 9A and the second maintenance terminal 9B. In addition, the permission information sending unit 52 sends a permitted or a not-permitted instruction to execute the connection job to the first maintenance terminal 9A and the second maintenance terminal 9B that sends the job selection.

The database storing unit 33 includes an operator list storing unit 53, a maintenance terminal list storing unit 55, a target terminal list storing unit 57, and a connection job list storing unit 59.

The operator list storing unit 53 stores an operator list 53a. FIG. 3 shows the operator list 53a. Each operator in the operator list 53a includes "ID" of a maintenance operator, "password" of the maintenance operator, and "log-in relay server" of the maintenance operator. The log-in relay server is shown combining the ID of the maintenance operator with the ID of the logged-in terminal. In the example shown in FIG. 3, it is seen that the operators Op1-Op4 are registered, a first operator Op1 is logging in to the first maintenance terminal 9A, a second operator Op2 is logging in to the center terminal 5, and a third operator Op3 is logging in to the second maintenance terminal 9B. It is also seen that a fourth operator Op4 is not logging in.

The maintenance terminal list storing unit 55 stores a maintenance terminal list 55a. FIG. 4 shows the maintenance terminal list 55a. Each maintenance terminal in the maintenance terminal list 55a includes "name" and "terminal ID" of the maintenance terminal that is allowed to access to the relay communication system 1. [0056] The target terminal list storing unit 57 stores a target terminal list 57a. FIG. 5 shows the target terminal list 57a. Each target terminal in the target terminal list 57a includes "name" and "terminal ID" of the target terminal that is allowed to access to the relay communication system 1.

Here, it is acceptable that the target terminal and the operator are stored as a plurality of groups that are associated with each other.

The connection job list storing unit 59 stores a connection job list 59a. FIG. 6 shows the connection job list 59a. The connection job list 59a includes one or more of connection jobs. Each connection job includes "target terminal ID", "connection candidate ID", and "job information". "Target terminal ID" is an ID of the target terminal that requests a maintenance, for example. "Connection candidate ID" is an ID of the operator that is allowed to connect to the target terminal, and stores one or more IDs. "Job information" shows which operator actually connects. In FIG. 6, it is seen that a first connection job and a second connection job is provided for the first target terminal 7A and the second target terminal 7B, respectively, the first operator Op1 is the candidate for the first connection job, the first operator Op1 and the third operator Op3 are the candidates for the second connection job. Moreover, it is seen that the first connection job is being executed by the first operator Op1.

It should be noted that, if the connection job making unit 45 makes the connection job, the connection job is added to the connection job list 59a. In addition, if the connection between the relay servers starts, the connection job list managing unit 49 changes the job information. Moreover, if the connection is cut, the connection job list managing unit 49 deletes the connection job from the connection job list 59a.

The interface 35 performs the communications within the LAN 13 using a private IP address. The interface 35 performs the communications via the WAN 3 using a global IP address.

Figure 7:
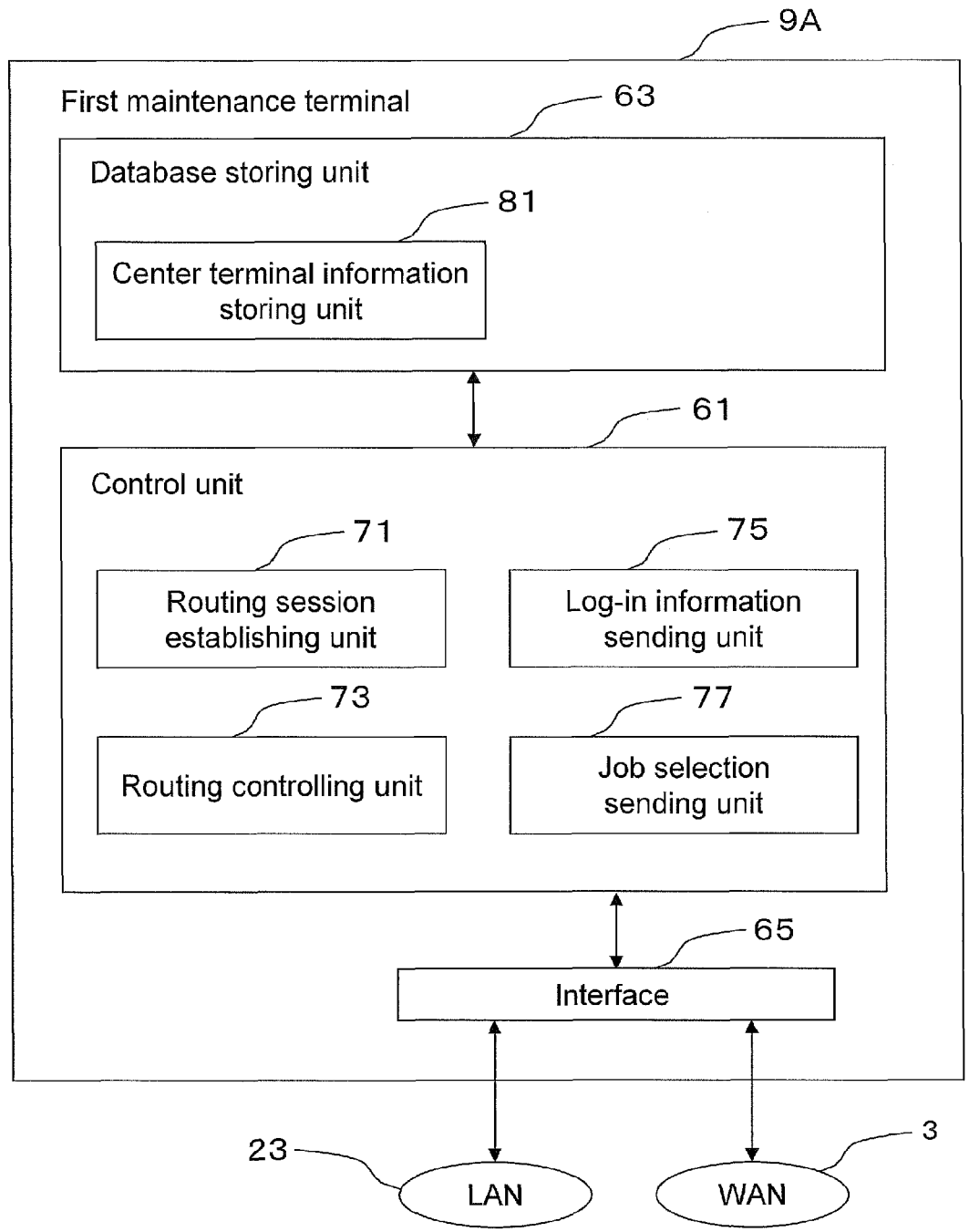
FIG. 7 is a figure showing a structure of a maintenance terminal.

Referring to FIG. 7, a structure of the first maintenance terminal 9A will be explained. Here, the explanation of the structure of the second maintenance terminal 9B is omitted because the structure is the same as that of the first maintenance terminal 9A.

FIG. 7 is a figure showing the structure of the maintenance terminal. The first maintenance terminal 9A includes a control unit 61, a database storing unit 63, and an interface 65.

The control unit 61 controls the whole first maintenance terminal 9A. The control unit 61 is a computer having CPU, RAM, and ROM and realizes various functions by executing a program stored in the memory. The control unit 61 includes a routing session establishing unit 71, a routing controlling unit 73, a log-in information sending unit 75, and a job selection sending unit 77.

The routing session establishing unit 71 establishes a routing session between the first maintenance terminal 9A and the first target terminal 7A or the second target terminal 7B. The routing controlling unit 73 performs a routing-control of communication packets between the first maintenance terminal and other LAN, using the routing session.

The log-in information sending unit 75 sends a log-in information to the center terminal 5. The job selection sending unit 77 sends a job selection to the first target terminal 7A or the second target terminal 7B.

The database storing unit 63 includes a center terminal information storing unit 81. The center terminal information storing unit stores center terminal information. The center terminal information includes a name and ID of the center terminal 5, although it is not shown.

Figure 8:
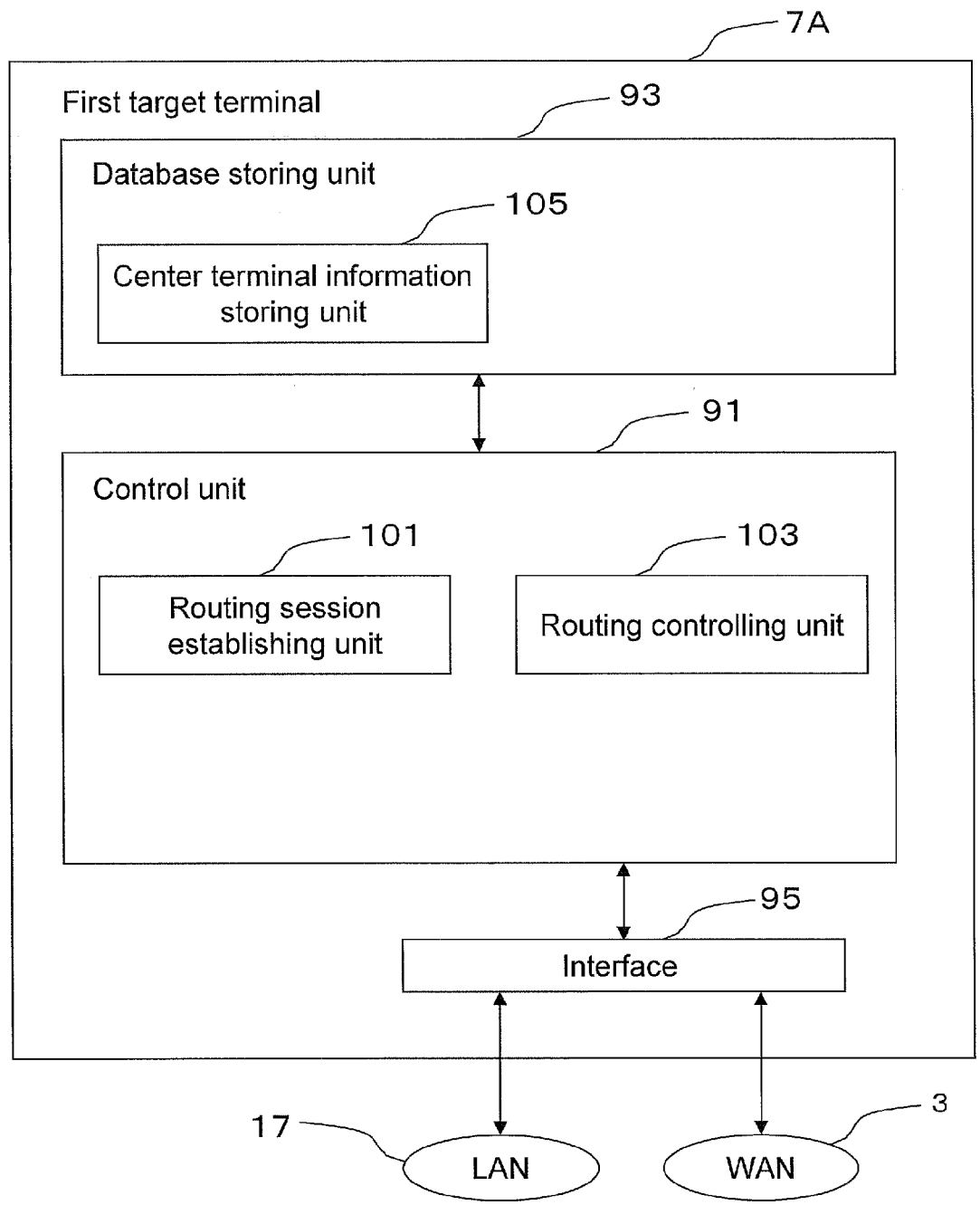
FIG. 8 is a figure showing a structure of a target terminal.

Referring to FIG. 8, a structure of the first target terminal 7A will be explained. Here, the explanation of the structure of the second target terminal 7B is omitted since the structure is preferably the same as that of the first target terminal 7A. FIG. 8 is a figure showing the structure of the target terminal. The first target terminal 7A includes a control unit 91, a database storing unit 93, and an interface 95.

The control unit 91 is programmed to control the whole first target terminal 7A. The control unit 91 preferably includes a computer including CPU, RAM, and ROM and performs various functions by executing a program stored in the memory. The control unit 91 includes a routing session establishing unit 101 and a routing controlling unit 103.

The routing session establishing unit 101 establishes a routing session between the first target terminal 7A and the first maintenance terminal 9A or the second maintenance terminal 9B. The routing controlling unit 103 performs a routing-control of communication packets between the first maintenance terminal and other LAN, using the routing session.

The database storing unit 93 includes a center terminal information storing unit 105. The center terminal information storing unit 105 stores a center terminal information. The center terminal information includes a name and ID of the center terminal, although it is not shown.

Figure 9:
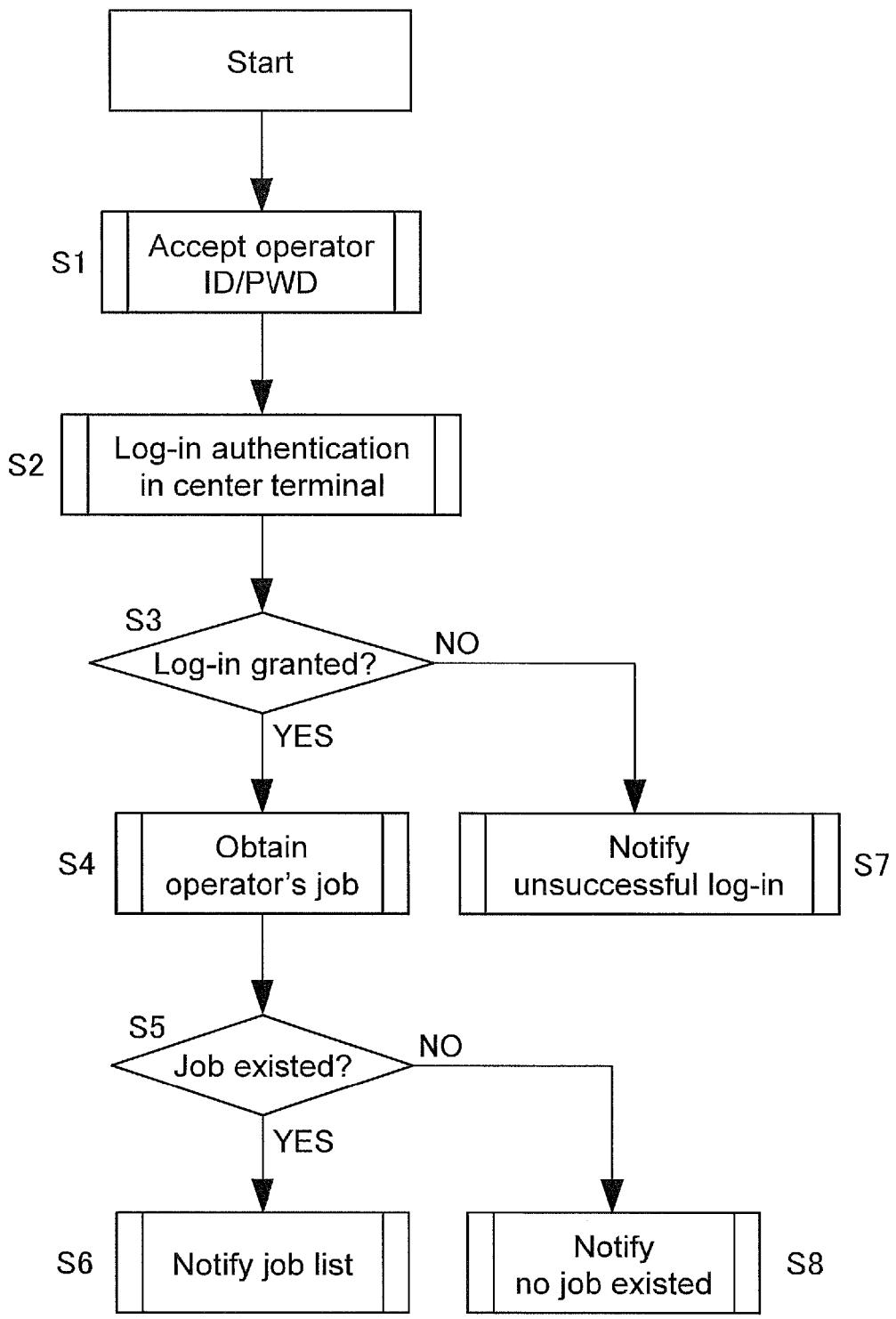
FIG. 9 is a flowchart showing an operation of a maintenance terminal accepting a log-in from an operator.
Figure 10:
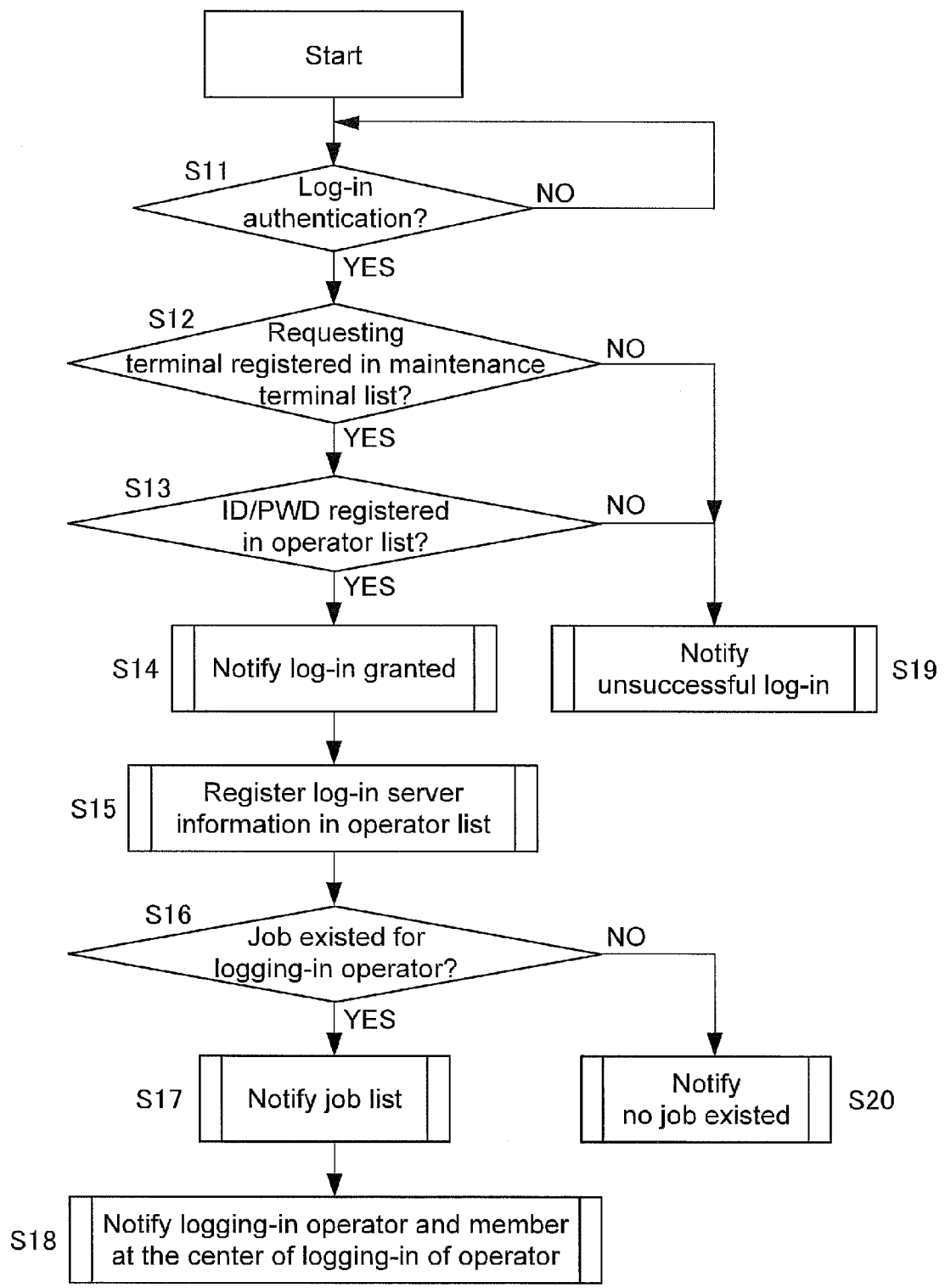
FIG. 10 is a flowchart showing an operation of a center terminal accepting a log-in of an operator from a maintenance terminal.

Referring to FIG. 9 and FIG. 10, a log-in operation of the operator will be explained. FIG. 9 is a flowchart showing an operation of the maintenance terminal accepting a log-in from the operator. FIG. 10 is a flowchart showing an operation of the center terminal accepting the log-in of the operator from the maintenance terminal.

Here, in the example below, the operation in which the first operator Op1 logs in to the relay communication system 1 from the first maintenance terminal by operating the first maintenance operating terminal 23A will be explained. However, it is acceptable that the first operator Op1 logs in to the relay communication system 1 from the first maintenance terminal 9A by operating the second maintenance operating terminal 23B, and it is acceptable that the first operator Op1 logs in to the relay communication system 1 from the second maintenance terminal 9B by operating the third maintenance operating terminal 27A or the fourth maintenance operating terminal 27B.

In the description below, referring to FIG. 9, the log-in control by the control unit 61 of the first maintenance terminal 9A will be explained.

In step S1 of FIG. 9, the first operator Op1 inputs an ID and a password by operating the first maintenance operating terminal 23A and these data are sent from the first maintenance operating terminal 23A to the first maintenance terminal 9A.

In step S2, the log-in information sending unit 75 of the first maintenance terminal 9A sends log-in information including the ID and the password to the center terminal 5.

In step S3, the control unit 61 receives a notification of granted log-in or a notification of unsuccessful log-in. If the control unit 61 receives the notification of granted log-in, the process proceeds to step S4. If the control unit 61 receives the notification of unsuccessful log-in, the process proceeds to step S7.

In step S4, the control unit 61 sends an inquiry to the center terminal 5 whether or not the connection job which the first operator Opt can execute exists.

In step S7, the control unit 61 sends the notification of unsuccessful log-in to the first maintenance operating terminal 23A.

In step S5, the connection job or a notification of no-job-existed is sent from the center terminal 5 and the control unit 61 determines whether or not the connection job which the first operator can execute exists. If the decision is "Yes", the process proceeds to step S6. If the decision is "No", the process proceeds to step S8.

In step S6, the control unit 61 sends the connection job to the first maintenance operating terminal 23A.

In step S8, the control unit 61 sends the notification of no-job-existed to the first maintenance operating terminal 23A.

Figure 19:
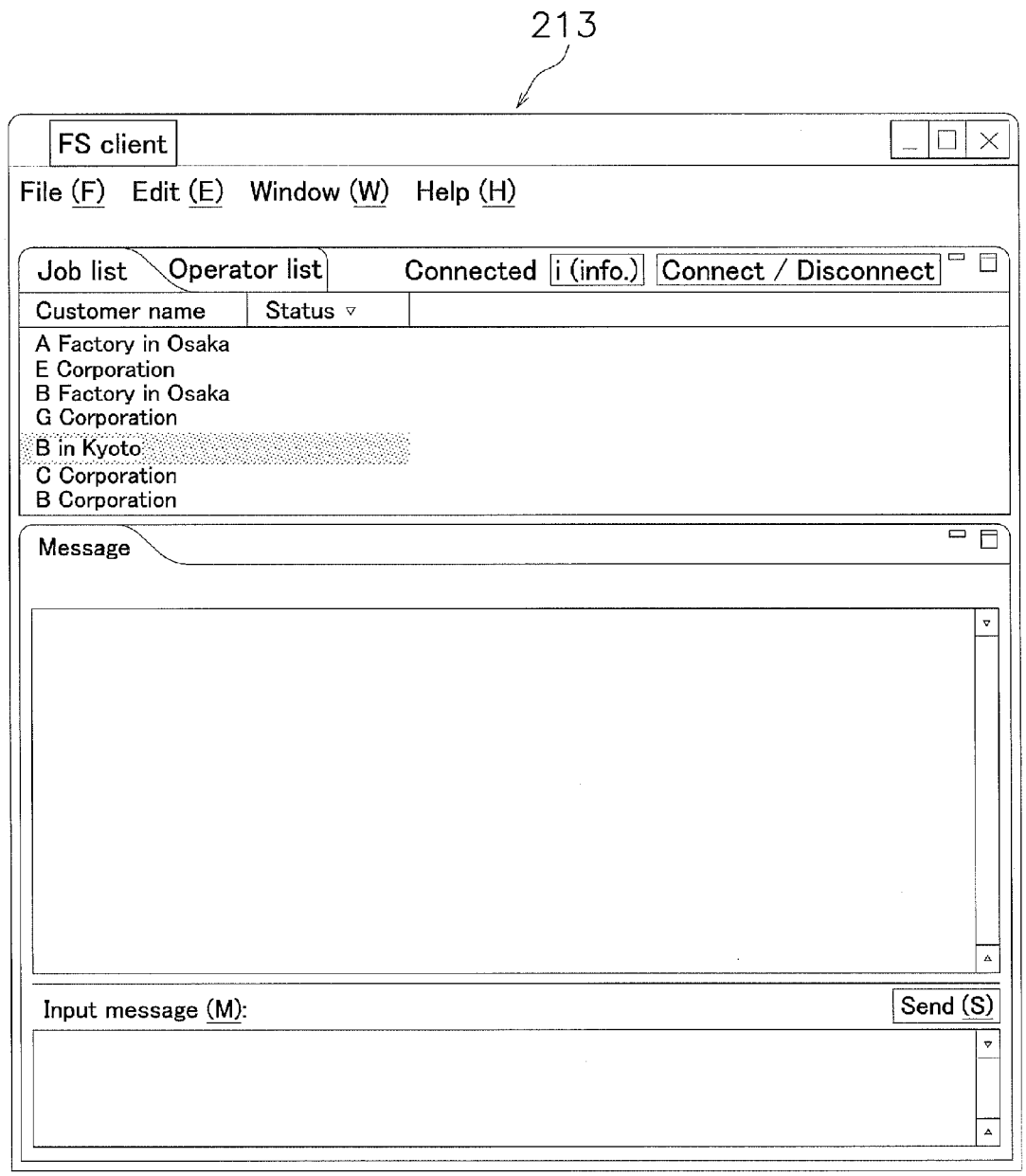
FIG. 19 is a connection job selecting screen of a maintenance terminal managing application displayed on a screen of a maintenance operating terminal.

On a display of the first maintenance operating terminal 23A, a list of the connection jobs is shown as shown in FIG. 19. On this screen, names of customers and operation statuses are shown. Thus, the first operator Op1 can connects to an unconnected equipment of the customer.

In the description below, referring to FIG. 10, the log-in control by the control unit 31 of the center terminal 5 will be explained.

In step S11 of FIG. 10, the log-in authenticating unit 43 of the control unit 31 waits for the log-in information from the first maintenance terminal 9A or the second maintenance terminal 9B to be received. If the log-in information is sent (corresponding to step S2 of FIG. 9), the process proceeds to step S12.

In step S12, the log-in authenticating unit 43 determines whether or not the first maintenance terminal 9A that sends the log-in information is registered in the maintenance terminal list 55a. If the decision is "Yes", the process proceeds to step S13. If the decision is "No", the process proceeds to step S19.

In step S13, the log-in authenticating unit 43 determines whether or not the ID and password in the log-in information are registered to the operator list 53a. If the decision is "Yes", the process proceeds to step S14. If the decision is "No", the process proceeds to step S19.

In step S14, the control unit 31 sends the notification of granted log-in to the first maintenance terminal 9A. In step S19, the control unit 31 sends the notification of unsuccessful log-in to the first maintenance terminal 9A.

In step S15, the control unit 31 registers log-in relay server information to the operator list 53a.

In step S16, the control unit 31 determines, for the inquiry from the first maintenance terminal 9A (step S4 of FIG. 9), whether or not the connection job for the logging-in operator exists, by searching the connection job list 59a. If the decision is "Yes", the process proceeds to step S17. If the decision is "No", the process proceeds to step S20.

In step S17, the connection job list sending unit 51 of the control unit 31 sends the connection job to which the logging-in first operator Op1 can connect to the first maintenance terminal 9A.

In step S18, the control unit 31 notifies the operator who has already logged in (for example, the third operator Op3) and the second operator Op2 as a member of the center of the logging-in. Thus, the connection job is updated in, for example, the second maintenance terminal 9B.

In step S20, the control unit 31 sends the notification of no-job-existed to the first maintenance terminal 9A.

As described above, if the operator newly logs in to the relay communication system 1, the connection job to which the logging-in operator can connect is sent from the center terminal 5 to the maintenance terminal. In addition, a connection job updated information is sent to the operator who has already logged in. Thus, if the operator logs in to the relay communication system 1, the operator can automatically obtain updated information of the connection job that can be connected. As the result, the maintenance operating terminal and the target system can be connected with each other quickly.

Figure 11:
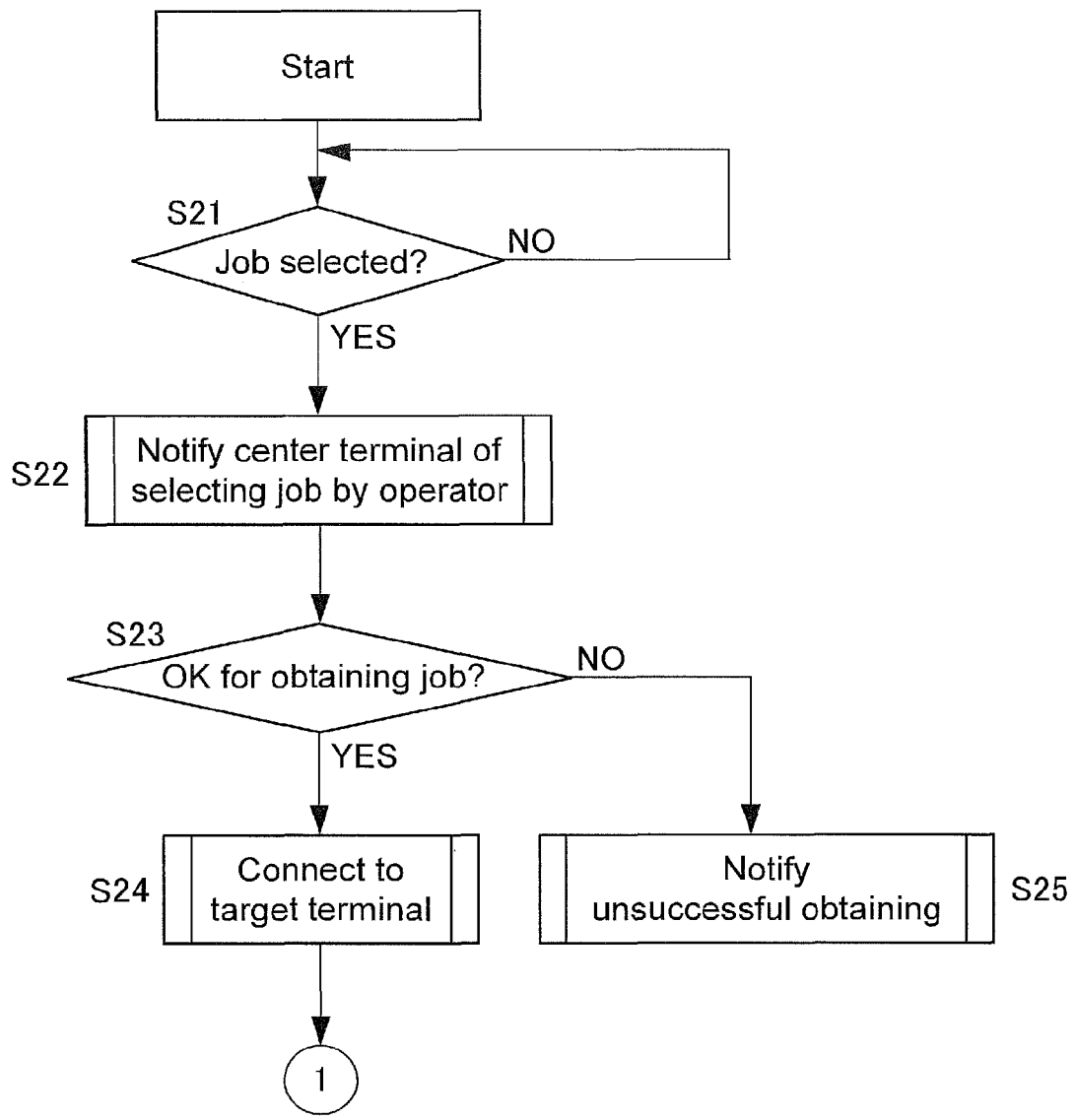
FIG. 11 is a flowchart showing an operation of a maintenance terminal receiving a job selection from an operator.
Figure 12:
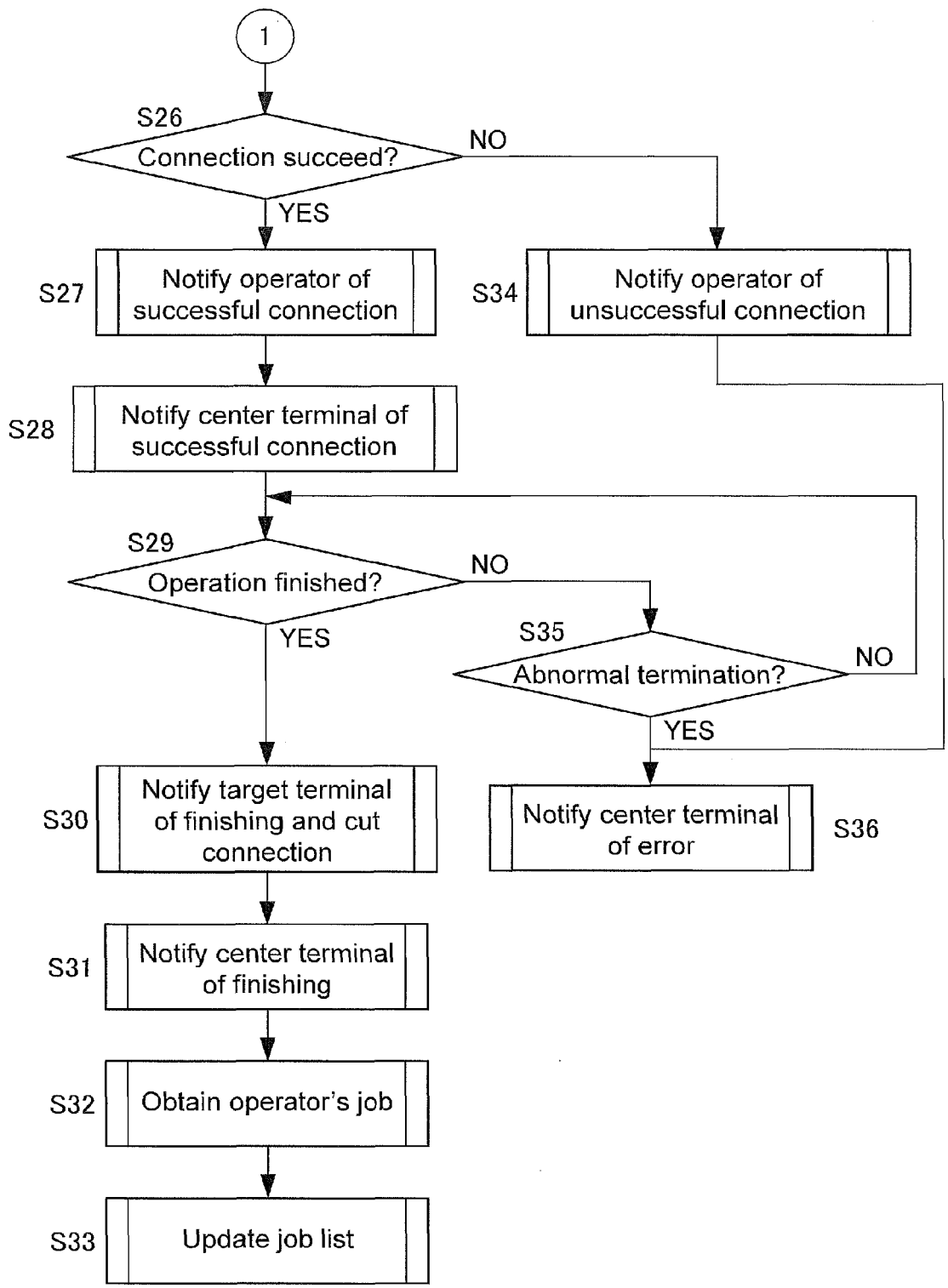
FIG. 12 is a flowchart showing an operation of a maintenance terminal receiving a job selection from an operator.
Figure 13:
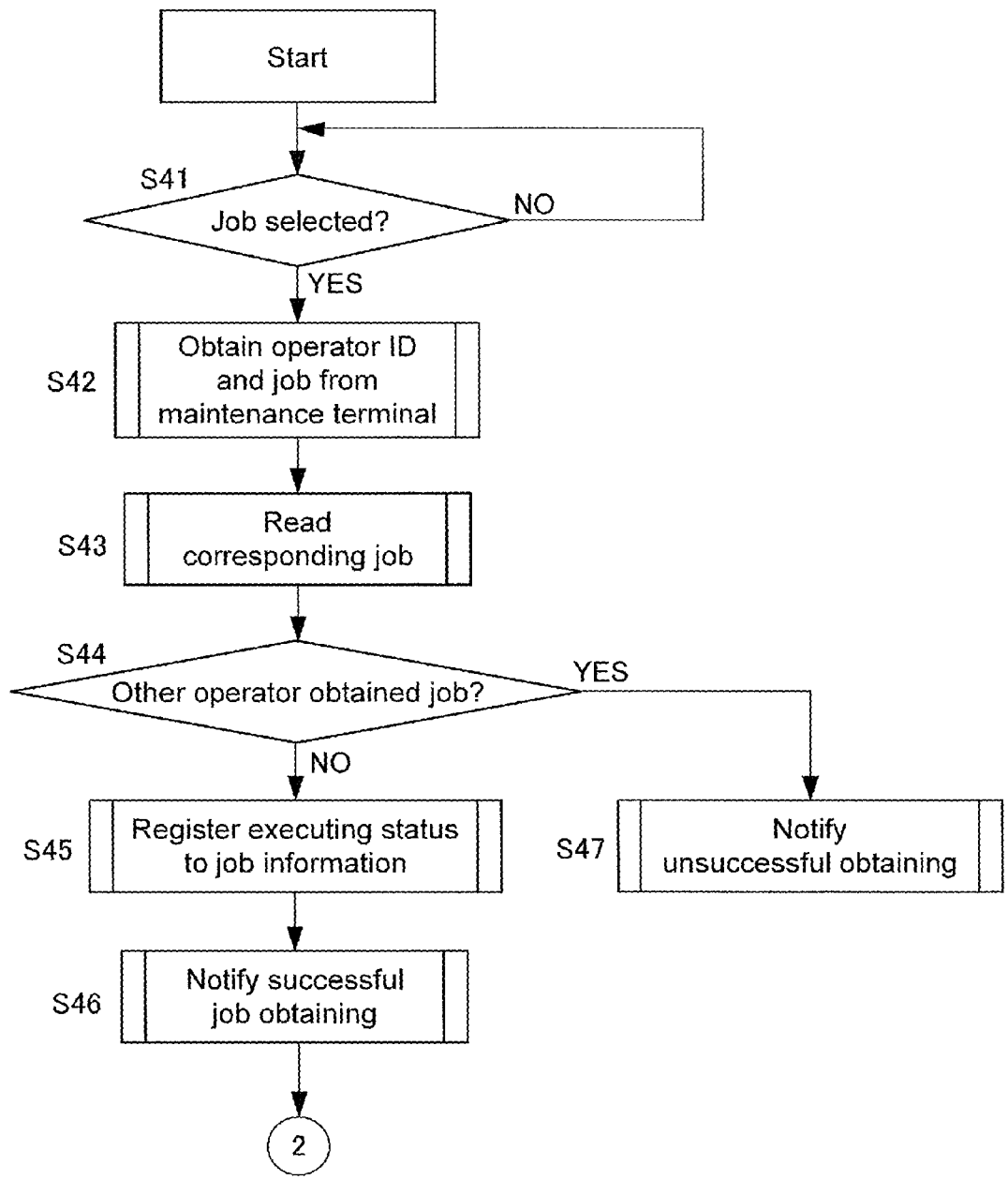
FIG. 13 is a flowchart showing an operation of a center terminal receiving a job selection of an operator from a maintenance terminal.
Figure 14:
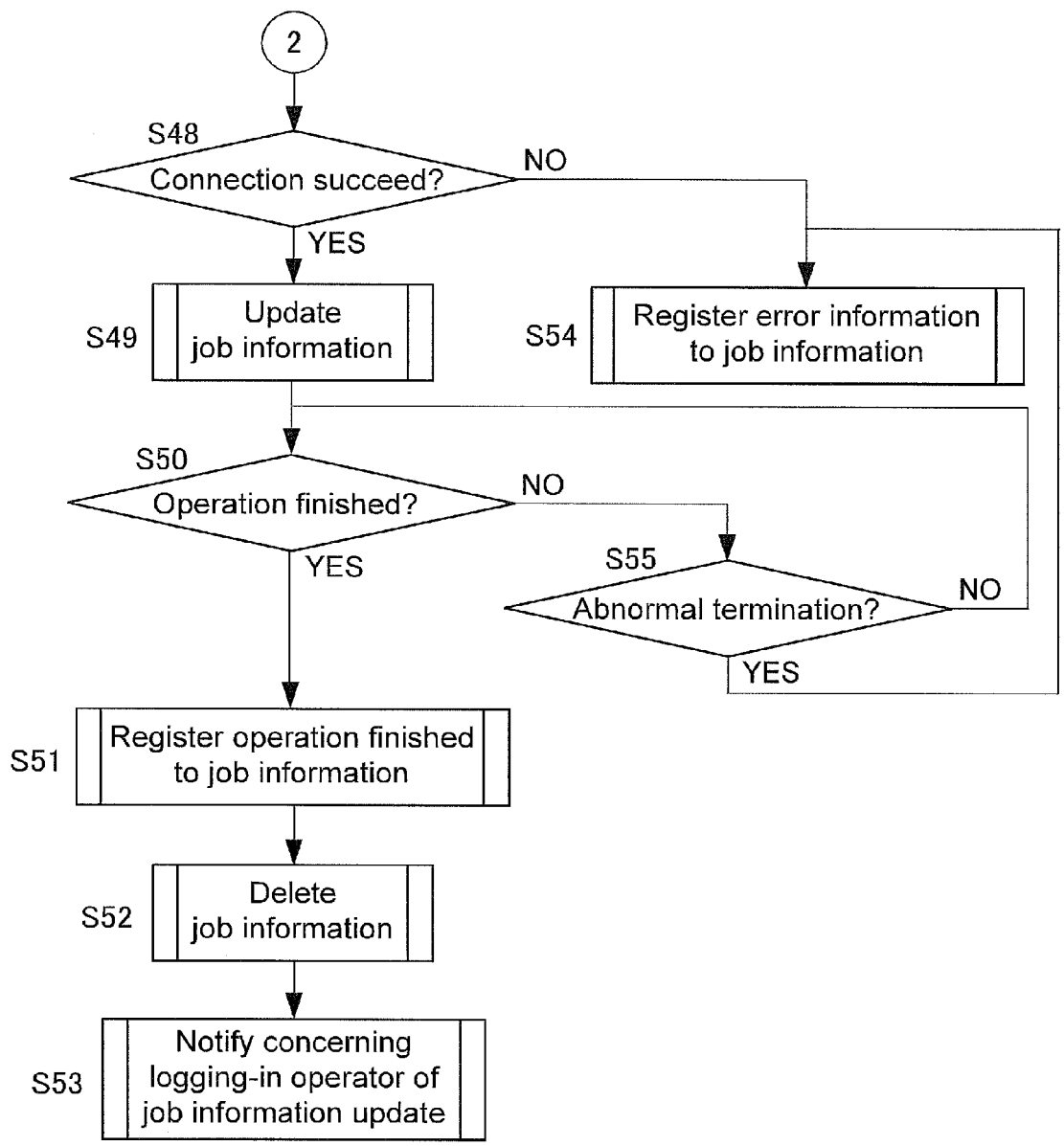
FIG. 14 is a flowchart showing an operation of a center terminal receiving a job selection of an operator from a maintenance terminal.

Referring to FIG. 11 through FIG. 14, a selection and execution of the connection job will be explained. FIG. 11 and FIG. 12 are flowcharts showing operations of the maintenance terminal receiving the job selection from the operator. FIG. 13 and FIG. 14 are flowcharts showing operations of the center terminal receiving the job selection of the operator from the maintenance terminal.

In the description below, referring to FIG. 11 and FIG. 12, the selection and execution of the connection job by the control unit 61 of the first maintenance terminal 9A will be explained.

In step S21 of FIG. 11, the control unit 61 waits for the job selection which the first operator Op1 inputs by operating the first maintenance operating terminal 23A to be received. It should be noted that the job selection is performed in the manner in which the first operator Op1 operates the first maintenance operating terminal 23A while seeing the screen shown in FIG. 19.

In step S22, the job selection sending unit 77 of the control unit 61 sends the job selection by the first operator Op1 to the center terminal 5.

In step S23, if a notification of successful or unsuccessful job obtaining is sent from the center terminal 5, the control unit 61 determines whether or not it is OK to obtain the job. If the decision is "Yes", the process proceeds to step S24. If the decision is "No", the process proceeds to step S25.

In step S24, the first maintenance terminal 9A connects to the first target terminal 7A (described later).

In step S25, the control unit 61 sends the notification of unsuccessful obtaining to the first maintenance terminal 9A.

The connection performed in step S24 is performed as follows.

The first maintenance terminal 9A starts to establish the routing session to the first target terminal 7A. Specifically, the routing session establishing unit 71 sends a request to establish the routing session to the first target terminal 7A, using a request ID. The routing session establishing unit 101 of the first target terminal 7A replies OK as an access permission to the first maintenance terminal 9A. As the result, a media session is established between the first maintenance terminal 9A and the first target terminal 7A. After establishing the media session, the first maintenance terminal 9A and the first target terminal 7A exchange network addresses of the first LAN 17 and the third LAN 25 that are routed. Thus, the first maintenance operating terminal 23A and the first target system 15A can communicate with each other via the routing session. As the result, the first operator Opt can start remotely maintaining the first target system 15A using the first maintenance operating terminal 23A.

In step S26, the routing controlling unit 73 of the control unit 61 determines whether or not the connection is successful. If the decision is "Yes", the process proceeds to step S27. If the decision is "No", the process proceeds to step S34.

In step S34, the routing controlling unit 73 sends the notification of unsuccessful connection to the first operator Op1. Specifically, the control unit 61 sends the notification of unsuccessful connection to the first maintenance operating terminal 23A. Then, the process proceeds to step S36.

In step S27, the routing controlling unit 73 sends the notification of successful connection to the first operator Op1. Specifically, the control unit 61 sends the notification of successful connection to the first maintenance operating terminal 23A.

In step S28, the routing controlling unit 73 sends the notification of successful connection to the center terminal 5.

In step S29, the routing controlling unit 73 determines whether or not the operation is finished. If the decision is "Yes", the process proceeds to step S30. If the decision is "No", the process proceeds to step S35.

In step S35, the routing controlling unit 73 determines whether or not the operation is abnormally finished. If the decision is "Yes", the process proceeds to step S30. If the decision is "No", the process proceeds to step S35.

In step S36, the routing controlling unit 73 sends a notification of error to the center terminal 5.

In step S30, the routing controlling unit 73 sends a notification of finishing to the first target terminal 7A and then disconnects the connection.

In step S31, the routing controlling unit 73 sends a notification of finishing connection to the center terminal 5.

In step S32, the control unit 61 sends an inquiry to the center terminal 5 whether or not there is a connection job which the first operator Op1 can execute.

In step S33, if the center terminal 5 responds to the inquiry whether or not there is the connection job which the first operator Op1 can execute, the control unit 61 updates the connection job list.

In the description below, referring to FIG. 13 and FIG. 14, a selection and an execution of the connection job by the control unit 61 of center terminal 5 will be explained.

In step S41 of FIG. 13, the control unit 31 of the center terminal 5 waits for the job to be selected (corresponding to step S22 of FIG. 11).

In step S42, the control unit 31 obtains the operator ID and the job information from the first maintenance terminal 9A.

In step S43, the job list managing unit 49 reads out the corresponding connection job from the connection job list storing unit 59.

In step S44, the connection determining unit 47 determines whether or not the other operator has obtained the connection job (in other words, the corresponding job is being executed by the other operator) (corresponding to step S23 of FIG. 11). If the decision is "No", the process proceeds to step S45. If the decision is "Yes", the process proceeds to step S47.

In step S45, the connection job list managing unit 49 registers "in execution" in the job information.

In step S47, the permission information sending unit 52 of the control unit 31 sends the notification of unsuccessful job obtaining (in other words, the information that the connection job selected by the first maintenance terminal 9A is in execution and information of the operator in execution) to the first maintenance terminal 9A (corresponding to step S23 of FIG. 11).

In step S46, the permission information sending unit 52 of the control unit 31 sends the notification of successful job obtaining (namely, a notification of a job permission) to the first maintenance terminal 9A (corresponding to step S23 of FIG. 11).

In step S48, the control unit 31 determines whether or not the first maintenance terminal 9A succeeds in connecting to the first target terminal 7A. If the decision is "Yes" (corresponding to step S28 of FIG. 12), the process proceeds to step S49. If the decision is "No", the process proceeds to step S54.

In step S49, the connection job list managing unit 49 updates the connection job. Specifically, the connection job list managing unit 49 adds "Op1 in execution" to the "job information" of the connection job list 59a. Then, the process proceeds to step S50.

In step S54, the connection job list managing unit 49 registers the error information to the connection job (specifically, "in operation" is deleted from the connection job). Moreover, the connection job list managing unit 49 notifies the operator who is included in the job and logs in via any of the maintenance terminals, of updating of the job information.

In step S50, the control unit 31 determines whether or not the connection operation is finished. If the decision is "Yes" (corresponding to step S31 of FIG. 12), the process proceeds to step S51. If the decision is "No", the process proceeds to step S55.

In step S55, the control unit 31 determines whether or not the operation is abnormally finished. If the decision is "Yes" (corresponding to step S36 of FIG. 12), the process proceeds to step S54. If the decision is "No", the process proceeds to step S50.

In step S51, the connection job list managing unit 49 registers "finished" to the connection job of the connection job list 59a.

In step S52, the connection job list managing unit 49 deletes the connection job of the connection job list 59a.

In step S53, the connection job list sending unit 51 sends the notification of updating the job information to the concerning logging-in operator.

Referring to FIG. 15 through FIG. 18, screens displayed on a display of the center terminal operating terminal 11 will be explained. FIG. 15 through FIG. 18 are operation and status displaying screens of the center terminal management application, displayed on the screen of the center terminal operating terminal. These screens are generated, for example, by an operating software that is installed in the center terminal operating terminal 11.

Figures 15, 16:
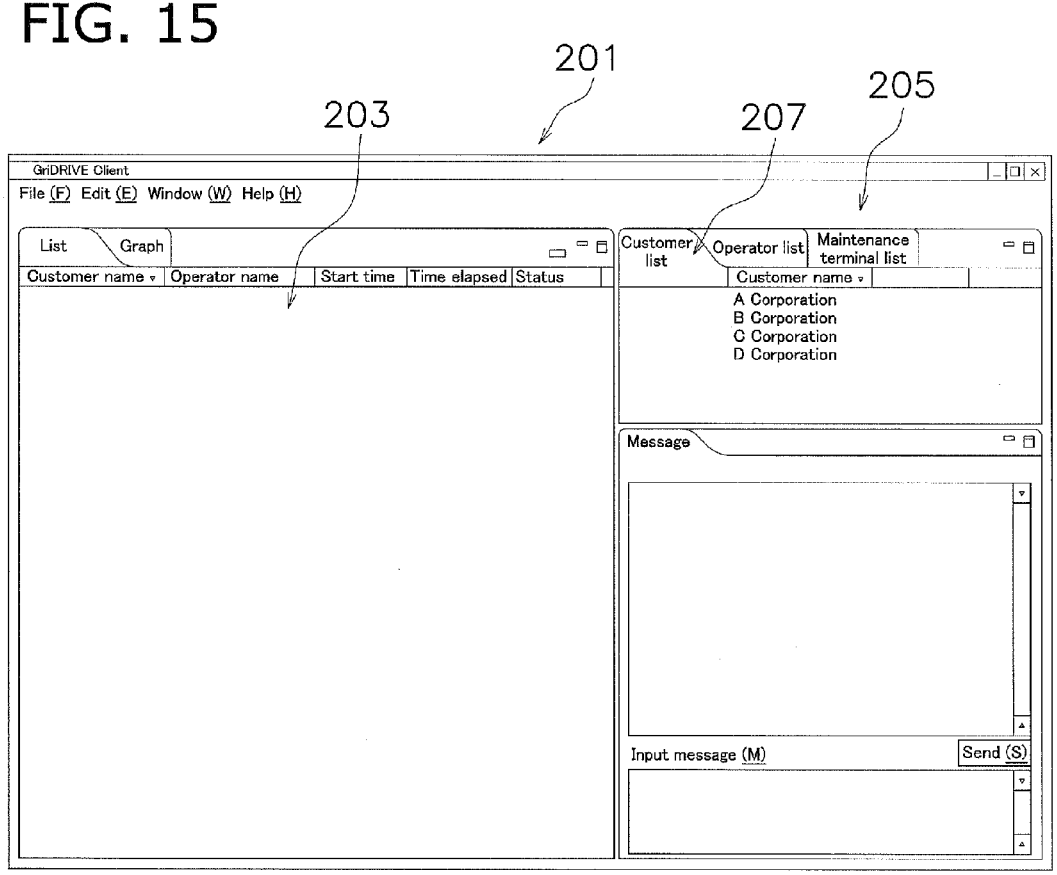
FIG. 15 is an operation and status displaying screen of a center terminal management application displayed on a screen of a center terminal operating terminal.
FIG. 16 is an operation and status displaying screen of a center terminal management application displayed on a screen of a center terminal operating terminal.

FIG. 15 shows a status displaying screen 201. The status displaying screen 201 includes a status displaying window 203 and a list window 205. The status displaying window 203 is a screen that shows the status of the job and the status of the connection. The list window 205 includes a list of customers, a list of operators, and a list of maintenance terminals.

The status displaying window 203 shows the statuses of a plurality of the connection jobs, as shown in FIG. 16. Each connection job includes a "customer name", a "starting time", a "time elapsed", a "status", a "customer code", "customer information 1", "customer information 2", a "maintenance operator ID", a "name of operator", a "maintenance operator information 1", and "maintenance operator information 2".

If the connection job is made, the "customer name", the "customer code", the "customer information 1", and the "customer information 2" are displayed on the status displaying window 203. In addition, the time at which the connection job is made is set to the "starting time" at this time.

If the connection is performed, the "maintenance operator ID", the "name of operator", the "customer code", the "maintenance operator information 1", and the "maintenance operator information 2" are displayed on the status displaying window 203. In addition, at this time, the connection starting time is displayed on the "starting time" and the time elapsed from the starting time is displayed on the "time elapsed".

"In maintenance", "maintenance finished", "abnormal", and "expired" are displayed on the "status" of the status displaying window 203.

With the above structure, the second operator Op2 as the center member monitors the connection status in the relay communication system 1 by watching the displaying screen of the center terminal operating terminal 11.

The second operator Op2 as the center member can display the list of customers, the list of the operators, and the list of the maintenance terminals by operating the list window 205. In FIG. 15, the list of customers 207 are shown. The customer name and the connection permission information are displayed on the list of customers 207. It should be noted that the second operator Op2 described here can determine whether the connection is permitted or prohibited.

Figure 17:
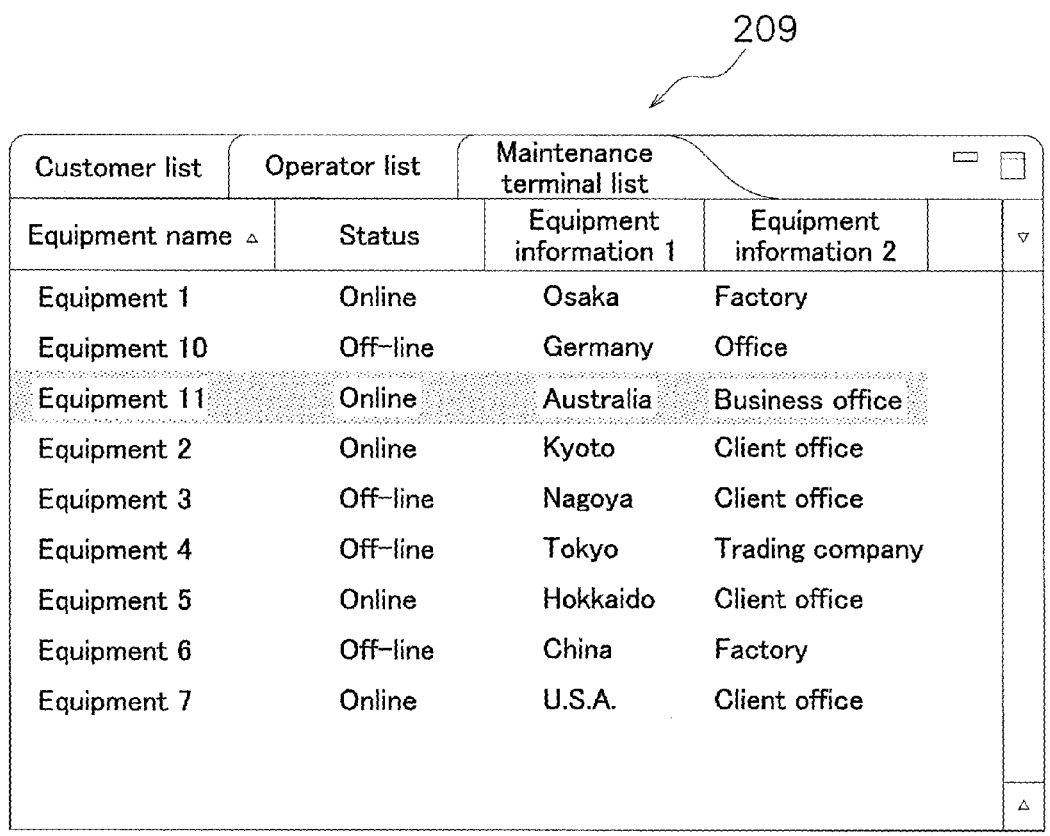
FIG. 17 is an operation and status displaying screen of a center terminal management application displayed on a screen of a center terminal operating terminal.

In FIG. 17, the list of maintenance terminals 209 is displayed. On the list of maintenance terminals 209, an equipment name of each maintenance terminal, a status, equipment information 1, and equipment information 2 are displayed.

Referring to FIG. 18, a job making screen will be explained.

The second operator Op2 as the center member can operate the center terminal operating terminal 11 connected to the center terminal 5, make the connection job that associates the predetermined target terminal with the operator ID, and register it to the center terminal 5. In the job making screen 211 of FIG. 18, a plurality of the maintenance operators are selected to the customer 4. This selection is done by the second operator Op2 as the center member. Here, it is, for example, the case where the target terminal sends the malfunction to the center terminal 5 that such job is made.

Referring to FIG. 19, a job selecting screen 213 in the first maintenance operating terminal 23A will be explained. FIG. 19 is a connection job selecting screen of the maintenance terminal managing application displayed on the screen of the maintenance operating terminal. In the job selecting screen 213, each job includes a "customer name" and a "status". A "connect/disconnect" function and a "send" function are also displayed on the job selecting screen 213.

As shown in FIG. 19, the first operator Op1 can execute the connection operation by selecting the customer that is unconnected from the job selecting screen 213.

According to a preferred embodiment of the present invention, a relay communication system 1 (one example of a relay communication system) includes client terminals and relay servers connected via a network. Each client terminal is configured to communicate, via the relay server to which the client terminal is connected, with another relay server or the client terminal that is connected to the relay server. Each relay server is also configured to communicate with another relay server or with the client terminal that is connected to the relay server. The relay communication system 1 includes a center terminal 5 (one example of a center terminal), a first target terminal 7A and a second target terminal (one example of a target terminal), a first maintenance terminal 9A and a second maintenance terminal 9B (one example of a maintenance terminal). The center terminal 5 includes a target terminal list storing unit 57 (one example of a target terminal registering unit) configured to register the target terminal and an operator list storing unit 53 (one example of an operator registering unit) configured to register an operator ID and an PWD. Each of the maintenance terminal and the target terminal includes a center terminal information storing unit 81 (one example of a center terminal ID registering unit) configured to register a center terminal ID. The center terminal 5 is configured to make a connection job that associates a predetermined target terminal with the operator ID and register the connection job to the center terminal. Any one of the maintenance terminals is configured to receive the specific operator ID and the PWD from a connected client terminal and sends an inquiry to the center terminal 5 whether or not the maintenance terminal can log in to the center terminal, and, if the logging-in is granted, the maintenance terminal is configured to receive the connection job assigned to the operator ID from the center terminal 5 and notify the operator of the connection job. When the maintenance terminal receives a selection of the connection job from the operator, the maintenance terminal is configured to send an inquiry to the center terminal whether or not the maintenance terminal can execute the connection job. If the connection job is allowed to be executed, the maintenance terminal is connected to the target terminal included in the connection job.

Therefore, the maintenance terminal can connect to the target terminal quickly in response to the connection request in the relay communication system where the relay servers are connected with each other.

When the center terminal 5 receives an inquiry whether or not the maintenance terminal can execute the connection job, the center terminal 5 is configured to notify the maintenance terminal of a permission to execute the connection job if the connection job is not being executed by other operator registered in the connection job. The center terminal 5 is configured to notify the maintenance terminal that the connection job selected is being executed and notify the maintenance terminal of operator information in execution if the connection job is being executed by another operator registered in the connection job.

If the center terminal 5 receives from the maintenance terminal the inquiry whether or not the maintenance terminal can execute the connection job and notifies the maintenance terminal of the permission to execute the connection job, the center terminal 5 is configured to register the connection job being in execution to the connection job and notify another operator, who is included in the connection job and logs in via any one of the maintenance terminals, that the connection job is updated.

If the center terminal 5 receives from the maintenance terminal a notification of finishing the connection job and determines based on the notification that the connection job is finished, the center terminal 5 is configured to delete the connection job. If the center terminal 5 determines a condition other than that the connection job is finished, the center terminal 5 is configured to delete status information showing that the connection job is in execution from the connection job. The center terminal 5 is configured to notify an operator, who is included in the connection job and logs in via any one of the maintenance terminals, that the connection job is updated.

The center terminal 5 includes a maintenance terminal list storing unit 55 (one example of a maintenance terminal registering unit) configured to register a relay server that becomes the maintenance terminal. If the center terminal 5 receives via the maintenance terminal a log-in request with the specific operator ID and PWD, the center terminal 5 is configured to determine whether or not the maintenance terminal which the operator uses is a registered terminal. If the maintenance terminal which the operator uses is registered, the center terminal 5 is configured to check the operator ID and PWD, and otherwise, the center terminal 5 is configured to return an error.

Preferred embodiments of the present invention are described above. However, the present invention is not limited to the above-described embodiments and various changes may be made without departing from the scope of the present invention. Especially, a plurality of preferred embodiments and modifications described in the present specification can be combined arbitrarily according to need, desire or preference.

In the above-described preferred embodiments, a remote operation is explained. However, the present invention is not limited to such an operation.

Preferred embodiments of the present invention can be applied broadly to a relay communication system where client terminals that are connected with relay servers are connected with each other as necessary, via the relay servers connected with each other via a network.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay communication system comprising:
client terminals and relay servers connected via a network, each of the client terminals being configured to communicate, via one of the relay servers to which the respective client terminal is connected, with another one of the relay servers or one of the client terminals that is connected to the another one of the relay servers, each of the relay servers being configured to communicate with another one of the relay servers or with one of the client terminals connected to the another one of the relay servers, the relay servers being configured to communicate with each other via a WAN, and each of the client terminals being configured to communicate via a LAN with a respective one of the relay servers where the client terminal is connected; wherein
one of the relay servers is configured to function as a center terminal;
at least one of the relay servers is configured to function as at least one target terminal;
at least one of the relay servers is configured to function as at least one maintenance terminal;
at least one of the client terminals is configured to function as a target system connected to any of the at least one target terminal via a first LAN;
at least one of the client terminals is configured to function as a maintenance operating terminal connected to any of the at least one maintenance terminal via a second LAN;
the target system is operated by the maintenance operating terminal via the first LAN, the WAN, and the second LAN;
the center terminal includes:
a target terminal registering unit configured to register the at least one target terminal; and
an operator registering unit configured to register an operator ID and a password; wherein
each of the at least one maintenance terminal and the at least one target terminal includes a center terminal ID registering unit configured to register a center terminal ID;
the center terminal is configured to make a connection job that associates a predetermined target terminal ID with the operator ID and is configured to register the connection job to the center terminal;
any of the least one maintenance terminal is configured to receive the operator ID and the password from the connected maintenance operating terminal and send an inquiry to the center terminal whether or not the at least one maintenance terminal can log in to the center terminal, and, if logging-in is granted, the at least one maintenance terminal is configured to receive the connection job assigned to the operator ID from the center terminal and notify an operator of the connection job;
the at least one maintenance terminal is configured to send an inquiry to the center terminal about whether or not the at least one maintenance terminal can execute the connection job when the at least one maintenance terminal receives a selection of the connection job from the operator; and
if the connection job is allowed to be executed, the at least one maintenance terminal establishes a routing session to the target terminal based on the target terminal ID included in the connection job, and exchanges network address of the first LAN and the second LAN with the target terminal such that the maintenance operating terminal communicates with the target system via the established routing session.

2. relay communication system according to claim 1, wherein,
when the center terminal receives the inquiry whether or not the at least one maintenance terminal can execute the connection job, the center terminal is configured to notify the at least one maintenance terminal of a permission to execute the connection job if the connection job is not being executed by another operator registered in the connection job; and
the center terminal is configured to notify the at least one maintenance terminal that the connection job selected is being executed and notify the at least one maintenance terminal of operator information in execution if the connection job is being executed by another operator registered in the connection job.

3. The relay communication system according to claim 2, wherein
if the center terminal receives from the at least one maintenance terminal the inquiry whether or not the at least one maintenance terminal can execute the connection job and notifies the at least one maintenance terminal of the permission to execute the connection job, the center terminal is configured to register the connection job in operation to the connection job and notify another operator, who is included in the connection job and can log in via any one of the at least one maintenance terminal, that the connection job is updated.

4. The relay communication system according to claim 2, wherein
if the center terminal receives from the at least one maintenance terminal a notification of finishing the connection job and determines based on the notification that the connection job is finished, the center terminal is configured to delete the connection job;
if the center terminal determines a condition other than that the connection job is finished, the center terminal is configured to delete status information showing that the connection job is in operation from the connection job, and the center terminal is configured to notify another operator, who is included in the connection job and can log in via any one of the at least one maintenance terminal, that the connection job is updated.

5. The relay communication system according to claim 1, wherein
the center terminal includes a maintenance terminal registering unit configured to register one of the relay servers that becomes the at least one maintenance terminal;
if the center terminal receives via the at least one maintenance terminal a log-in request with the ID and the password of the operator, the center terminal is configured to determine whether or not the at least one maintenance terminal which the operator uses is a registered terminal; and
if the at least one maintenance terminal which the operator uses is registered, the center terminal is configured to check the operator ID and the password, and otherwise, the center terminal is configured to return an error.

6. A relay communication system comprising:
an administering relay server;
a plurality of first relay servers;
at least one second relay server;
a target system connected to one of the first relay servers via a first LAN; and
a maintenance operating terminal is connected to the at least one second relay sever via a second LAN;
the administering relay server is configured to memorize first relay server IDs of the plurality of the first relay servers and at least one operator ID;
the administering relay server is configured to receive registration of a connection job that associates one of the first relay server IDs with the at least one operator ID and memorize the connection job;
the at least one second relay server is configured to receive the at least one operator ID from the maintenance operating terminal and notify the administering relay server of the operator ID;
the administering relay server is configured to receive the at least one operator ID from the at least one second relay server and authenticate the at least one operator ID;
the administering relay server is configured to select the connection job that includes the operator ID from the connection job and send the connection job that is selected to the at least one second relay server;
the at least one second relay server is configured to receive the connection job from the administering relay server and notify the maintenance operating terminal of the connection job;
the at least one second relay server is configured to request the administering relay server to execute the connection job that is selected by the maintenance operating terminal;
the administering relay server is configured to send possible-to-connect information in response to a request to execute the connection job from the at least one second relay server;
the at least one second relay server is configured to receive the possible-to-connect information from the administering relay server; and
if the connection is possible, the at least one second relay server establishes a routing session to the first relay server based on a first server ID included in the connection job and exchanges network addresses of the first LAN and the second LAN with the first relay server, such that the maintenance operating terminal communicates with the target system via the established routing session.

* * * * *